United States Patent
Sakamoto et al.

[11] Patent Number: 6,093,898
[45] Date of Patent: Jul. 25, 2000

[54] ACCELERATION DETECTING DEVICE

[75] Inventors: Kazunori Sakamoto, Chiryu; Tateki Kawamura, Nagoya; Tsutomu Takeuchi, Gamagori; Koichi Fujita, Toyota, all of Japan

[73] Assignee: Aisin Seiki Kabushiki Kaisha, Kariya, Japan

[21] Appl. No.: 09/210,992

[22] Filed: Dec. 15, 1998

[30] Foreign Application Priority Data

Dec. 15, 1997 [JP] Japan ................................. 9-344919

[51] Int. Cl.⁷ ............................................. H01H 35/14
[52] U.S. Cl. ............................. 200/61.48; 200/61.45 R
[58] Field of Search ............................ 73/514.22, 514.37; 200/61.45 R, 61.48

[56] References Cited

U.S. PATENT DOCUMENTS

| 4,315,434 | 2/1982 | Eastman | 73/514.22 |
| 5,389,751 | 2/1995 | Breed | 200/61.48 |
| 5,920,045 | 7/1999 | Suzuki et al. | 200/61.45 R |

FOREIGN PATENT DOCUMENTS

| 08235980 | 9/1996 | Japan . |
| 08235981 | 9/1996 | Japan . |
| 08264088 | 10/1996 | Japan . |

*Primary Examiner*—John E. Chapman
*Attorney, Agent, or Firm*—Burns, Doane, Swecker & Mathis, LLP

[57] ABSTRACT

An acceleration detecting device includes a housing, a weight pivotally mounted inside the housing for rotating along a locus in response to an applied acceleration, a spring provided between the housing and the weight to apply a biasing force to the weight against the applied acceleration, and a contact assembly located outside the locus of the weight. The contact assembly is adapted to be electrically closed by the rotation of the weight. An arc-shaped circumference of the weight maintains the same distance between the weight and the contact assembly during the rotation of the weight. When an excessive acceleration is applied to the device, the weight rotates from an initial position against the biasing force of the spring to electrically close the contact assembly. The weight is returned to the initial position by the biasing force of the spring to electrically open the contact assembly when the excess acceleration is no longer present. Because the spring which applies the biasing force is separated from the contact assembly, the biasing force is reliably maintained for a longer period. Further, the weight can rotate without any interference to the contact assembly because the arc-shaped outer circumference of the weight maintains the contact assembly spaced from the locus of the weight.

15 Claims, 4 Drawing Sheets

6,093,898

ACCELERATION DETECTING DEVICE

This application corresponds to and claims priority under 35 U.S.C. § 119 with respect to Japanese Application No. 09 (1997)-344919 filed on Dec. 15, 1997, the entire content of which is incorporated herein by reference.

FIELD OF THE INVENTION

This invention generally relates to an acceleration or impact detecting device. More particularly, the present invention relates to an impact or acceleration detecting device that is adapted to detect the acceleration or impact associated with, for example, the collision of a vehicle for triggering a safety system such as a vehicle air bag system.

BACKGROUND OF THE INVENTION

Japanese Laid-Open Patent Publication No. 08-264088 published on Sep. 13, 1996 discloses an acceleration detecting device that includes a hollow housing, a weight pivotally supported in the hollow housing for being rotated in response to an applied acceleration, a cam mounted on the weight to be rotated integrally with the weight, and a contact assembly electrically closed by rotation of the weight. The contact assembly always contacts the cam to apply a biasing force to the cam to keep the weight at an initial position. When the weight rotates against the biasing force applied from the electrical contacts to the cam, the cam electrically closes the contact assembly to generate an electrical signal.

The acceleration detecting device described above suffers from the disadvantage that as the weight keeps rotating, the contact assembly keeps bending. Accordingly, the contact assembly can experience plastic deformation due to frequent rotations of the weight. As this results, the contact assembly may not return the weight to the initial position so that the contact assembly may remain closed after disappearance of the acceleration.

In light of the foregoing, a need exists for an acceleration detecting device that is not susceptible to the same disadvantages and drawbacks as other known devices.

It would be desirable to provide an acceleration detecting device that is able to reliably return the weight to its initial position.

It would also be desirable to provide an acceleration detecting device that is able to reliably open and close the contact assembly.

SUMMARY OF THE INVENTION

In accordance with the present invention, an acceleration detecting device includes a housing, a weight pivotally mounted inside the housing for rotating along a locus in response to an applied acceleration, and a spring provided between the housing and the weight to apply a biasing force to the weight in a direction opposite the applied acceleration. A contact assembly is located substantially outside the locus of the weight and is adapted to be electrically closed during rotation of the weight. A contact assembly controller maintains the same distance between the weight and the contact assembly during the rotation of the weight.

According to the present invention, the weight rotates against the biasing force of the spring to electrically close the contact assembly when excessive acceleration is applied to the weight. In contrast, the weight returns to its initial position by the biasing force of the spring to electrically open the contact assembly when the excessive acceleration is no longer applied. Because the spring generating the biasing force is separated from the contact assembly, the biasing force is reliably maintained for a longer period. Additionally, the weight is able to rotate without any interference to the contact assembly because the contact assembly controller maintains the contact assembly off from the locus of the weight. Further, because the contact assembly controller maintains the same distance between the weight and the contact assembly during the rotation of the weight, the contact assembly can be reliably opened and closed according to the acceleration applied to the weight.

In accordance with a further aspect of the invention, an acceleration detecting device includes an enclosing device which encloses an internal space, a movable element mounted in the internal space and movable in response to an applied acceleration, a detecting mechanism for detecting movement of the moving means, and an arrangement which maintains the same distance between the movable element and the detecting mechanism under the applied acceleration.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENT

Figure 1:
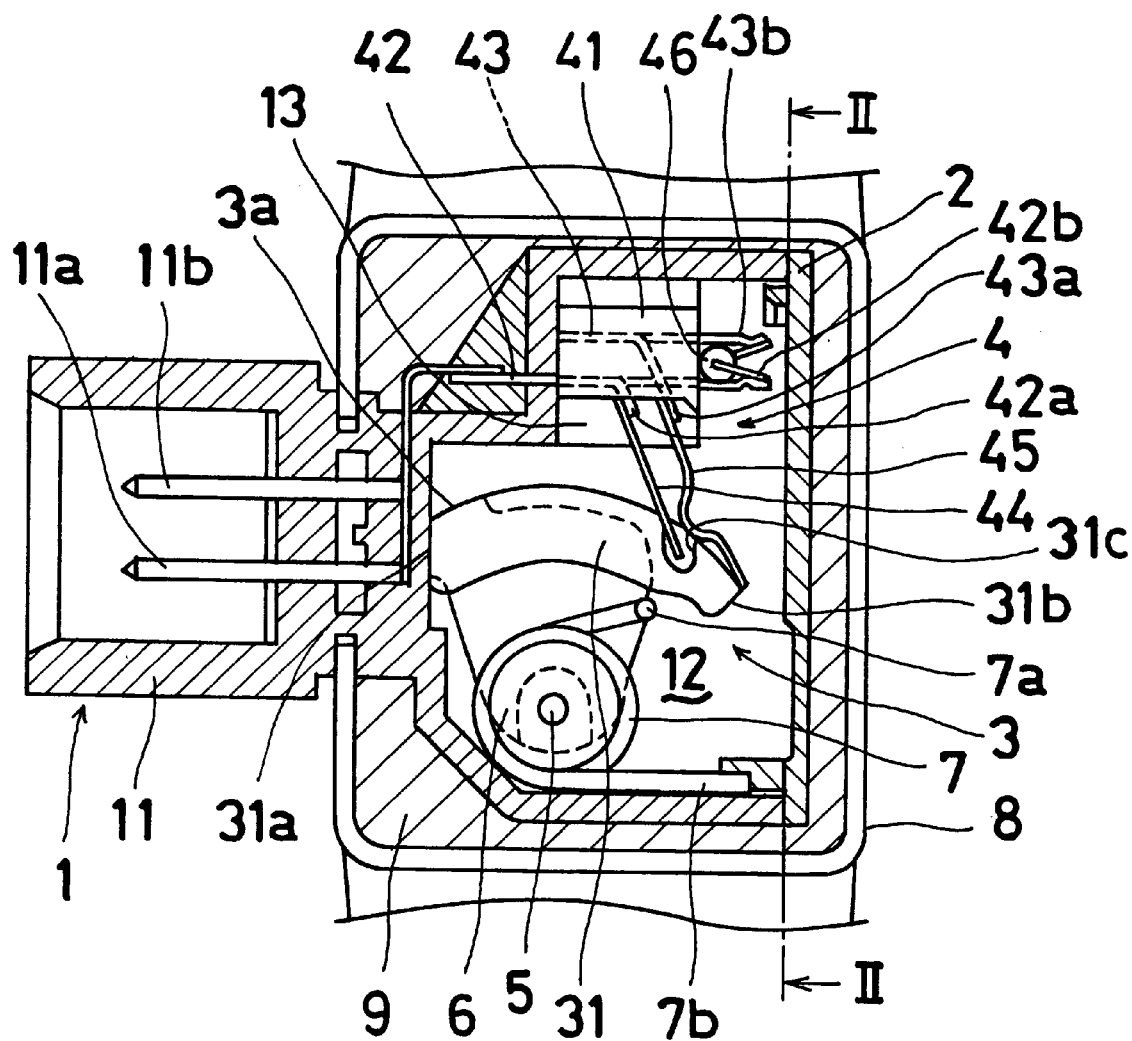
FIG. 1 is a cross sectional view of an acceleration detecting device according to the present invention.
Figure 2:
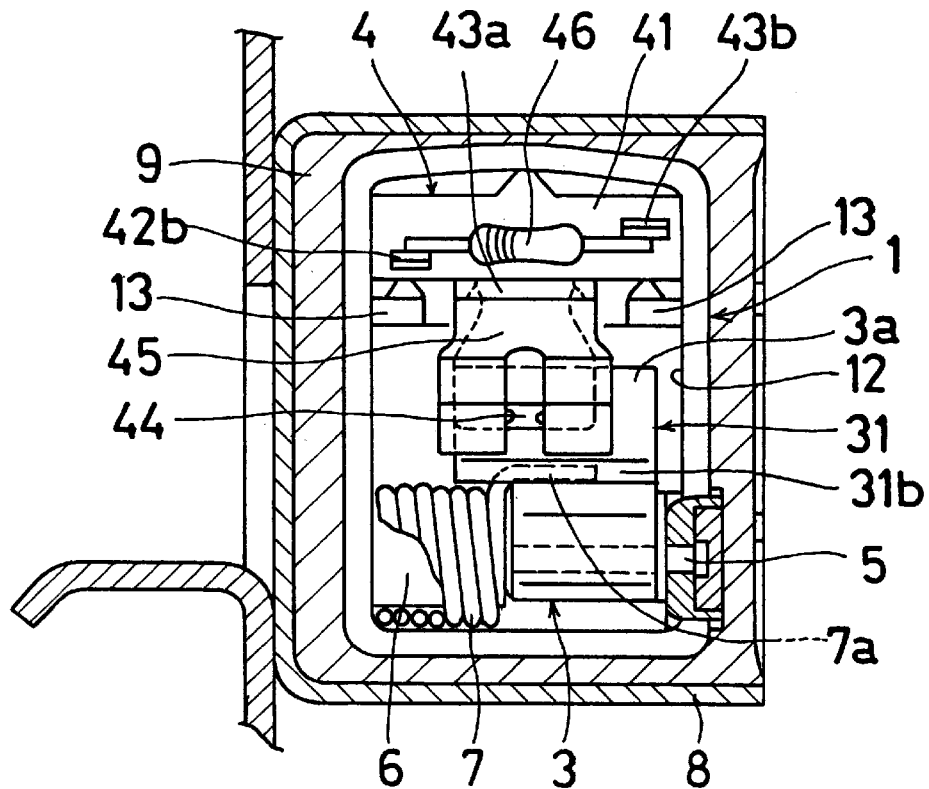
FIG. 2 is a cross sectional view of the acceleration detecting device according to the present invention taking along the section line II—II in FIG. 1.

With reference initially to FIGS. 1 and 2, the acceleration or impact detecting device of the present invention includes a hollow plastic housing 1 provided with a connector 11. The connector 11 is integrally formed with the remainder of the housing 1. The housing 1 includes an internal space 12 that is closed by a cover 2. The cover 2 is hermetically joined to the housing 1 by ultrasonic welding. Mounted within the internal space 12 within the housing 1 is a weight 3 and a contact assembly 4.

The weight 3 possesses a sector-like shape and is pivotally supported by a pin 5 at an apex or central part of the weight 3. Both ends of the pin 5 are supported by the side wall of the housing 1 so that the weight 3 is held in the internal space 12. A plastic portion 31 is integrally molded to the weight 3. The plastic portion 31 provides an arc-shaped outer circumference or circumferential surface 3a whose center is at the pin 5. The arc-shaped outer circumference 3a of the weight 3 thus possesses a radius of curvature having a center of curvature corresponding to the pin 5. A respective stopper portion 31a, 31b is formed at each circumferential end of the plastic portion 31. The stopper portions 31a, 31b project from the sides of the weight 3 so that they are capable of touching or contacting the inside of the housing 1.

The pin 5 is also surrounded by a collar 6 and a spring 7. The spring 7 is wound around the collar 6. One end 7a of the spring 7 is hooked around the weight 3 at the side near the stopper 31b. The other end 7b of the spring 7 extends along the housing 1 and is hooked onto the cover 2 as shown in FIG. 1 so that the end 7b of the spring is positioned between the cover and the side wall of the housing 1. The spring 7 always applies a biasing force to the weight 3 to return the weight 3 to an initial position at which the stopper portion 31a touches or contacts the housing 1 in the manner shown in FIG. 1.

The contact assembly 4 includes a plastic main body 41, a first coupler 42 and a second coupler 43. The main body 41 is positioned in a space that is defined by the housing 1 and a pair of projections 13. The main body 41 is thus held in position within the housing 1 by the side wall of the housing 1 and the projections 13. The projections 13 are integrally formed with the housing 1 and extend towards the cover 2.

The first and second couplers 42, 43 are embedded in the main body 41. The ends of the first and second couplers 42, 43 extend through the housing 1 and are mechanically and electrically joined with respective terminals 11a, 11b of the connector 11 by welding. The first coupler 42 possesses first and second forks 42a, 42b and the second coupler 43 also possesses first and second forks 43a, 43b. The first forks 42a, 43a are bent to project from the main body 41 towards the arc-shaped outer circumference 3a of the weight 3.

A first electrode 44 and a second electrode 45 are mechanically and electrically joined with the first forks 42a, 43a of the first and second couplers 42, 43. The first and second electrodes 44, 45 extend generally parallel to one another towards the weight 3. The second electrode 45 possesses an arcuate shaped portion as seen in FIG. 1 and contacts the arc-shaped outer circumference 3a of the weight 3. One end of the first electrode 44 is positioned in a groove 31c that is formed on the arc-shaped outer circumference 3a of the weight 3.

The first electrode 44 is adapted to selectively contact the second electrode 45 depending on the rotational position of the weight 3. Although the first and second electrodes 44, 45 are described above as being separate from the first and second couplers 42, 43, it is also possible to integrally form the first and second electrodes 44, 45 with the first and second couplers 42, 43 by forming the electrodes as extensions of the first and second couplers 42, 43.

The second forks 42b, 43b of the first and second couplers 42, 43 extend and project from the main body 41 towards the cover 2. An electrical resistor 46 is connected between the second forks 42b, 43b. The electrical resistance between the first and second couplers 42, 43 can be changed and is detected by an external device (not shown) depending upon the position of the weight 3. When the first electrode 44 contacts the second electrode 45, the first and second couplers 42, 43 are electrically connected by the first and second electrodes 44, 45 so that an external device connected to the terminals 11a, 11b detects a low electrical resistance. On the other hand, when the first electrode 44 is not in contact with the second electrode 45, the external device detects a high electrical resistance generated by the electrical resistor 46. In case the external device detects a non-conductive state between the first and the second couplers 42, 43, a wire would be indicated as being broken somewhere between the external device and the first and the second couplers 42, 43.

The groove 31c that is formed on the arc-shaped outer circumference 3a of the weight 3 opens outwardly to the arc-shaped outer circumference 3a of the weight 3 and extends in the thickness direction of the weight 3 (i.e., the right-left direction as seen with reference to the illustration in FIG. 2). As described above, one end of the first electrode 44 is inserted in the groove 31c in the outer circumferential surface 3a of the weight 3. The first electrode 44 does not contact the second electrode 45 when the first electrode 44 is located within the groove 31c so that the first and second couplers 42, 43 are connected with a high electrical resistance. Because the arc-shaped outer circumference 3a of the weight 3 is formed on the plastic portion 31, the groove 31c is easily and precisely formed on the arc-shaped outer circumference 3a. Further, it is possible to accurately position the groove 31c in the arc-shaped outer circumference 3a of the weight 3.

The housing 1 is stored in a metal case 8 as seen in FIG. 1 after the weight 3 and the contact assembly 4 are disposed in the housing 1. The inside of the metal case 8 is filled with a sealant 9 to seal up the housing 1. The metal case 8 may be mounted on an automobile body as partially illustrated in FIG. 2.

Figure 3:
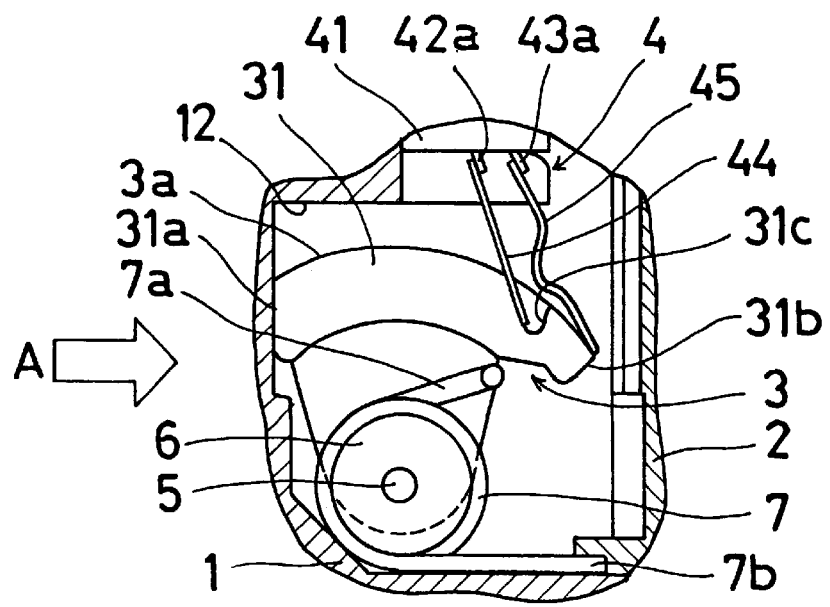
FIG. 3 is a partial cross sectional view of the acceleration detecting device showing one operating position of the device.

Referring now to FIGS. 3, 4, 5 and 6, the operation of the acceleration detecting device of the present invention is described below. FIG. 3 shows the condition of the acceleration detecting device when no acceleration is applied to the weight 3. In this position, the weight 3 receives the biasing force from the spring 7 so that the weight 3 is positioned in the initial position at which one end region of the stopper portion 3a of the weight 3 touches or contacts the housing 1. Also, the end of the first electrode 44 is located in the groove 31c of the weight 3 so that the first electrode 44 is separated from the second electrode 45. At the same time, one end of the second electrode 45 is located on the arc-shaped outer circumference 3a of the weight 3. In this initial position of the device, no electrical connection is made between the first and second electrodes 44, 45 and so the electrical resistance between the first and second couplers 42, 43 is high.

Figure 4:
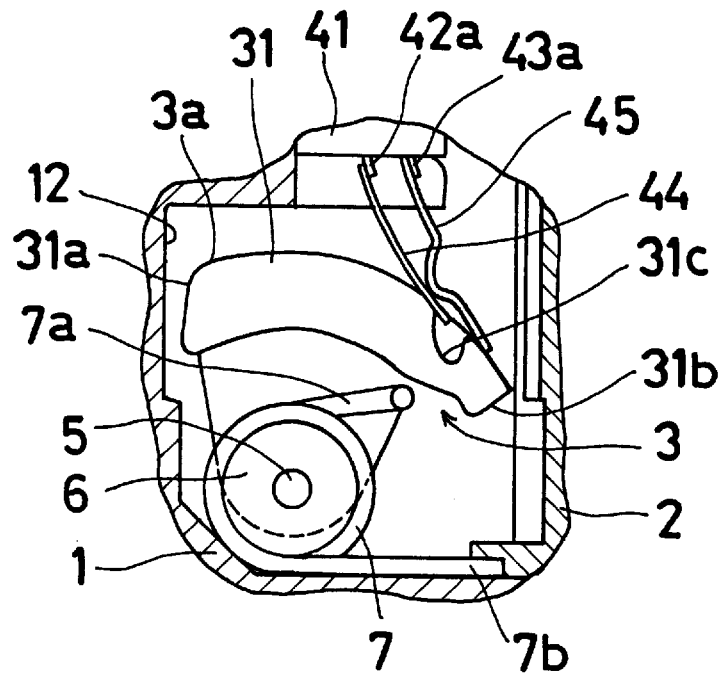
FIG. 4 is a partial cross sectional view of the acceleration detecting device showing another operating position of the device.
Figure 6:
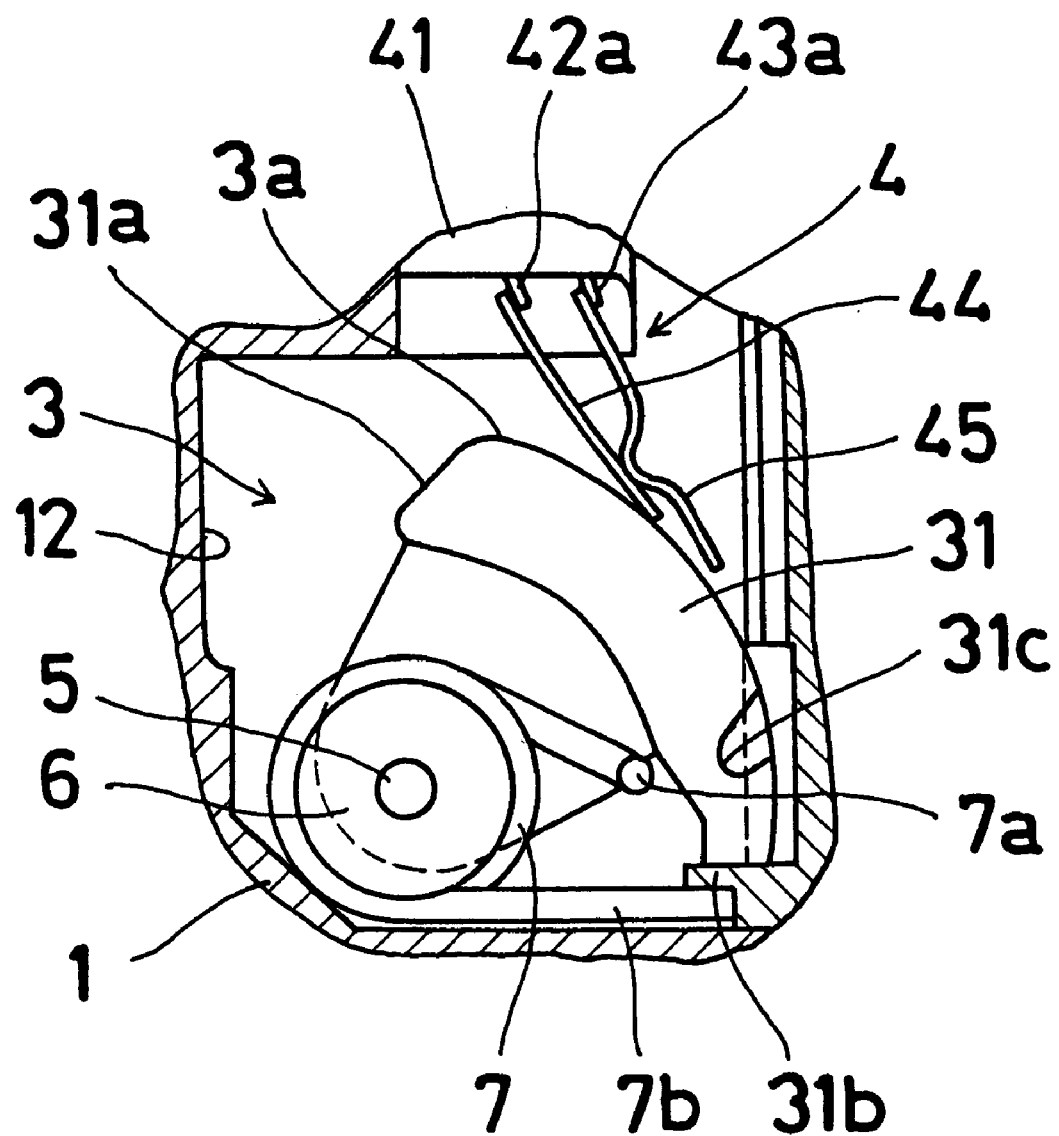
FIG. 6 is a partial cross sectional view of the acceleration detecting device showing a further operation position of the device.

When an acceleration exceeding a predetermined value occurs in the direction A shown in FIG. 3, due to for example, a collision of the vehicle, the weight 3 rotates against the biasing force of the spring 7 and the inertial force of the weight 3 until the stopper part 31b touches or contacts the housing 1 as shown in FIG. 6. As shown in FIG. 4, as the weight 3 rotates, the first electrode 44 moves out of the groove 31c in the weight 3 so that the first electrode 44 slides on the arc-shaped outer circumference 3a of the weight 3. The first electrode 44 is bent as it moves out of the groove 31c, thus causing the first electrode 44 to contact the second electrode 45. Thus, the first coupler 42 is electrically connected to the second coupler 43. The excess acceleration is thus detected by virtue of the decrease in the electrical resistance between the first coupler 42 and the second coupler 43.

Figure 5:
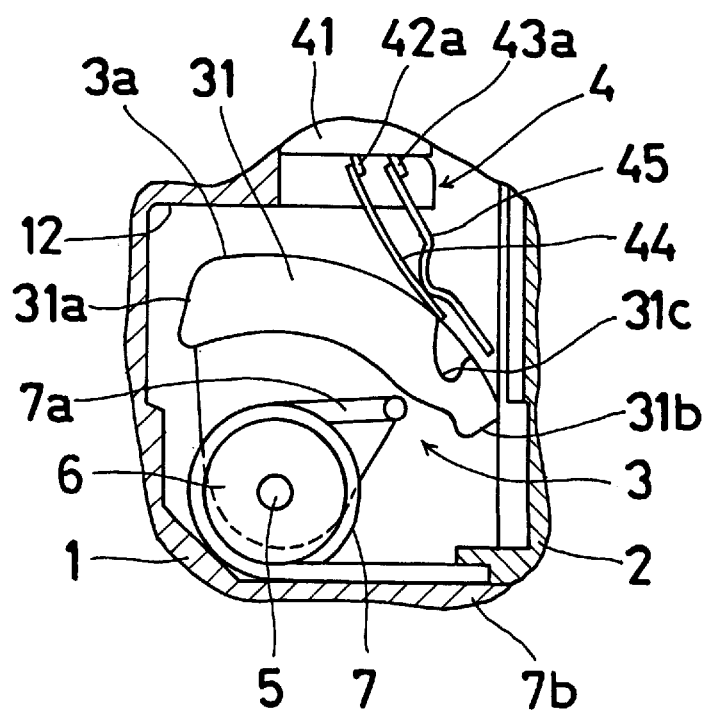
FIG. 5 is a partial cross sectional view of the acceleration detecting device showing another operating position of the device.

During the rotation of the weight 3 in the manner shown in FIGS. 4, 5 and 6, the first electrode 44 slides along the arc-shaped outer circumference 3a of the weight 3. As the first electrode 44 slides on the arc-shaped outer circumference 30 of the weight 3, the second electrode 45 is pushed and bent by the first electrode 44 so that the second electrode 45 moves away from the arc-shaped outer circumference 3a of the weight 3. Thus, the first electrode 44 is pinched between the second electrode 45 and the arc-shaped outer circumference 3a of the weight 3 so that the spring force of the second electrode 45 maintains electrical contact between the first and second electrodes 44, 45 in a reliable manner. Also, because the distance between the arc-shaped outer circumference 3a of the weight 3 and the rotational center of the weight 3 is maintained constant (i.e., is always the same), the first and second electrodes 44, 45 do not bend beyond that which is necessary while the first electrode 44 slides along the arc-shaped outer circumference 3a of the weight 3.

As explained above, the electrical contact between the first and second electrodes 44, 45 is reliably maintained during the rotation of the weight 3 so that momentary non-contact or chattering between the first and second electrodes 44, 45 is reliably prevented from being generated. Further, because the arc-shaped outer circumference 3a of the weight 3 forms a part of the plastic portion 31, the first electrode 44 is able to easily slide along the arc-shaped outer circumference 3a of the weight 3. Thus, the weight 3 is able to smoothly rotate.

Upon disappearance or removal of the acceleration in the direction A, the weight 3 rotates in the reverse direction and returns to the initial position shown in FIG. 3. As already explained above, at the initial position of the weight 3, the stopper portion 31a contacts the housing 1 in the manner shown in FIG. 3. Accordingly, the one end of the first electrode 44 once again enters the groove 31c on the outer circumference 3a of the weight 3 to thereby disengage the first electrode 44 from the second electrode 45. Thus, the high electrical resistance between the first and second couplers 42, 43 is detected.

According to the present invention, the weight 3 rotates against the biasing force of the spring 7 to electrically close the contact assembly 4 when excessive acceleration is applied to the weight 3. In contrast, the weight 3 returns to the initial position by the biasing force of the spring 7 to electrically open the contact assembly 4 when the excess acceleration disappears or is no longer present. Because the biasing force is generated by the spring 7 which is separate from the contact assembly 4, the biasing force is reliably maintained for a longer period of time. In addition, the weight 3 is able to rotate without any interference to the contact assembly 4 because the arc-shaped outer circumference 3a of the weight 3 maintains the contact assembly 4 off of or spaced from the locus of the weight 3. Further, because the arc-shaped outer circumference 3a of the weight maintains the same distance between the weight 3 and the contact assembly 4 during the rotation of the weight 3, the contact assembly 4 can be reliably opened and closed in accordance with the acceleration applied to the weight 3. The arc-shaped outer circumference 3a of the weight 3 thus forms a contact assembly controller for maintaining the same distance between the weight 3 and the contact assembly 4 during the rotation of the weight 3.

Also, the weight 3 can be easily and precisely manufactured because the groove 31 is formed on the plastic portion 31 of the weight 3. According to an additional advantageous aspect of the present invention, because the arc-shaped outer circumference 3a of the weight 3 is formed as a part of the plastic portion 31, the first electrode 44 is able to easily slide on the arc-shaped outer circumference 3a. This means that the weight 3 is able to rotate very smoothly.

Moreover, the contact assembly 4 can be reliably opened and closed according to the acceleration applied to the weight 3 because the arc-shaped outer circumference 3a of the weight 3 maintains the same distance between the weight 3 and the contact assembly 4 during the rotation of the weight 3.

The principles, a preferred embodiment and the mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An acceleration detecting device comprising:
    a housing;
    a weight pivotally mounted inside the housing for rotating about a rotational center along a locus in response to an applied acceleration;
    a spring provided between the housing and the weight to apply a biasing force to the weight in a direction opposite the applied acceleration;
    a contact assembly located substantially outside the locus of the weight and adapted to be electrically closed during rotation of the weight; and
    a contact assembly controller for maintaining the same distance between the rotational center of the weight and the contact assembly during the rotation of the weight while the contact assembly is electrically closed.

2. The acceleration detecting device in accordance with claim 1, wherein the contact assembly controller is comprised by a circumference of the weight.

3. The acceleration detecting device in accordance with claim 2, wherein the circumference of the weight is made of plastic.

4. The acceleration detecting device in accordance with claim 2, wherein the contact assembly includes a first electrode and a second electrode, the circumference of the weight including a groove receiving an end portion of the first electrode to disengage the first electrode from the second electrode in the absence of the applied acceleration.

5. The acceleration detecting device in accordance with claim 4, wherein the end portion of the first electrode moves out of the groove and moves along the circumference of the weight during rotation of the weight to cause the first electrode to contact the second electrode.

6. An acceleration detecting device comprising:
    enclosing means for enclosing an internal space;
    rotating means mounted in the internal space and rotatable in response to an applied acceleration;
    detecting means including a closable contact assembly for detecting rotation of the rotating means; and
    means for maintaining the same distance between a rotational center of the rotating means and the detecting means while the contact assembly is closed under the applied acceleration.

7. The acceleration detecting device in accordance with claim 6, wherein the moving means is a rotatably mounted weight having an outer circumference provided with a groove, said weight being rotatable between a first position in the absence of the applied acceleration and a second position under the applied acceleration.

8. The acceleration detecting device in accordance with claim 7, wherein the contact assembly includes a pair of electrodes mounted within the internal space, one of said electrodes having an end portion located in the groove when the weight is in the first position.

9. The acceleration detecting device in accordance with claim 7, wherein the weight is mounted on a pin.

10. The acceleration detecting device in accordance with claim 6, wherein the contact assembly includes a pair of electrodes mounted within the internal space.

11. An acceleration detecting device comprising:

a housing;

a weight pivotally mounted inside the housing for rotating from an initial first position in response to an applied acceleration, said weight having an outer circumference and a rotational center;

a spring operatively associated with the weight to apply a biasing force to the weight causing the weight to rotate towards the first position;

a first electrode and a second electrode mounted within the housing, the first electrode having an end portion spaced from the second electrode when the weight is positioned in the first position, said end portion of the first electrode moving along the outer circumference of the weight as the weight rotates away from the first position under the applied acceleration and contacting the second electrode, the end portion of said first electrode continuing to move along a portion of the outer circumference of the weight while said weight continues rotating away from said first position after the end portion of the first electrode contacts the second electrode, a distance between the rotational center of the weight and the outer circumference of the weight being constant along said portion of the outer circumference of the weight.

12. The acceleration detecting device in accordance with claim 11, wherein the weight is pivotally mounted on a pin, the rotational center of the weight coinciding with the pin.

13. The acceleration detecting device in accordance with claim 11, wherein the outer circumference of the weight is made of plastic.

14. The acceleration detecting device in accordance with claim 11, wherein the outer circumference of the weight is provided with a groove, the end portion of the first electrode being located in the groove when the weight is in the first position.

15. The acceleration detecting device in accordance with claim 14, wherein the end portion of the first electrode moves out of the groove and moves along the outer circumference of the weight during rotation of the weight way from the first position to cause the first electrode to contact the second electrode.

* * * * *